(12) United States Patent
Beaudion et al.

(10) Patent No.: US 7,193,379 B2
(45) Date of Patent: Mar. 20, 2007

(54) ELECTRONIC CIRCUIT ARRANGEMENT FOR SWITCHING AN ELECTRICAL LOAD IN A FAIL SAFE MANNER

(75) Inventors: David Beaudion, Sainte-Therese (CA); Sylvain Chartier, Lachenaie (CA); Lorne O'Connor, Laval (CA); Eric Valin, Lachenaie (CA)

(73) Assignee: WABTEC Holding Corp., Wilmerding, PA (US)

( * ) Notice: Subject to any disclaimer, the term of this patent is extended or adjusted under 35 U.S.C. 154(b) by 341 days.

(21) Appl. No.: 10/966,473

(22) Filed: Oct. 15, 2004

(65) Prior Publication Data
US 2005/0083614 A1   Apr. 21, 2005

Related U.S. Application Data

(60) Provisional application No. 60/512,840, filed on Oct. 20, 2003.

(51) Int. Cl.
*H02P 7/00* (2006.01)

(52) U.S. Cl. ............... 318/280; 318/139; 318/439; 318/254

(58) Field of Classification Search ........... 318/280, 318/254, 138, 439, 434, 445, 453, 469, 465; 395/182.02; 702/73; 180/287; 714/48; 323/288
See application file for complete search history.

(56) References Cited

U.S. PATENT DOCUMENTS 5,526,264 A   6/1996   Niggemann et al.

| | | | |
|---|---|---|---|
| 6,629,050 B2 * | 9/2003 | Modgil | 702/73 |
| 2004/0130309 A1 * | 7/2004 | Bucur et al. | 323/288 |
| 2004/0160131 A1 | 8/2004 | Veil et al. | |

FOREIGN PATENT DOCUMENTS

| EP | 572961 | 1/1996 |
|---|---|---|
| EP | 073188 | 12/2004 |

* cited by examiner

*Primary Examiner*—Karen Masih
(74) *Attorney, Agent, or Firm*—James Ray & Assoc.

(57) ABSTRACT

An electronic circuit arrangement for switching an electrical load disposed intermediate a power source and a ground includes a combinatorial logic block for receiving and processing at least one condition signal and for generating a first enabling signal. A biasing element generates a bias voltage upon receiving the first enabling signal. A first switch disposed intermediate the electrical load and the power source conducts upon application of the bias voltage enabling passage of an electrical supply current from the power source to the electrical load. A fail-safe circuit operation is achieved with the use of a microprocessor which generates a second enabling signal feeding into the biasing element and a second switch disposed intermediate the electrical load and the ground and which conducts upon application of a third enabling signal from the microprocessor thus enabling passage of the electrical supply current to ground. First and second feedback circuits monitor the state of the electrical load and provide status feedback to the microprocessor which is adapted for annunciating a fault condition.

28 Claims, 3 Drawing Sheets

ELECTRONIC CIRCUIT ARRANGEMENT FOR SWITCHING AN ELECTRICAL LOAD IN A FAIL SAFE MANNER

CROSS-REFERENCE TO RELATED APPLICATIONS

This application is related to and claims priority from U.S. Provisional Patent Application Ser. No. 60/512,840 filed on Oct. 20, 2003.

FIELD OF THE INVENTION

The present invention relates, in general, to an electronic circuit arrangement for switching an electrical load and, more particularly, the instant invention relates to an electronic circuit arrangement for switching an electrical load in a fail safe manner and, still more particular, the instant invention relates to an electronic circuit arrangement for switching an electrical load in a fail safe manner within a transit vehicle.

BACKGROUND OF THE INVENTION

The following background information is provided to assist the reader in understanding the environment in which the invention will typically be used. The terms used herein are not intended to be limited to any particular narrow interpretation unless specifically stated otherwise in this document.

Electrical load devices such as motors, solenoids, batteries, transformers and the like are employed in a variety of devices, machines and industrial processes. It is well known that the electrical load must change its state from OFF to ON in order to perform a designated function and change the state back to OFF after the function has been performed. Such changes in state are controlled by additional electrical devices forming a control circuit in combination with electrical load. Upon receiving a condition signal, the control circuit would enable the electrical load to change its state.

In certain safety applications such as light bars, contact mats or strips used for machine safety, locking devices employing solenoids or small motors or power operators for opening and closing doors in a transit vehicle, it is important to change the state of the electrical load only when predetermined conditions are verified within the control circuit. For example, to open the door of the transit vehicle it is required to verify that a door open signal is received in combination with the propulsion signal indicating that the vehicle is below a predetermined speed threshold. On the other hand, in order to activate the propulsion motors of a transit vehicle it is required to verify that sensors monitoring door position indicate that all doors have been closed.

In another aspect, it is required to change the state of the electrical load in a fail-safe manner and in a predetermined sequence eliminating an opportunity for component failures to enable such change in state. This especially applies to electronic devices that have various failure modes, sometimes difficult to characterize, with short-circuit and sensitivity to supply voltage transients mode being some of them.

Yet, in another aspect, it is desirable to monitor the change of state process in order to abort such process when failures occur and further to annunciate any abnormal conditions.

SUMMARY OF THE INVENTION

The present invention overcomes the aforementioned disadvantages by employing an electronic circuit arrangement capable of switching an electrical load in a fail-safe manner. The electrical load is disposed in a path intermediate a power source and a ground. The circuit arrangement includes at least one combinatorial logic block for receiving and processing at least one condition signal. The at least one combinatorial logic block produces a first enabling signal which is received by a bias element for producing a bias voltage. A first switch, which is disposed serially with the electrical load intermediate thereof and the power source, conducts upon application of the bias voltage and passes an electrical supply current to the electrical load.

A fail-safe circuit operation is achieved with the use of a microprocessor, which validates at least one condition signal independently from the combinatorial logic block and produces a second enabling signal received by the bias element.

A second switch disposed serially with the electrical load intermediate thereof and the ground is adapted for receiving a third enabling signal produced by the microprocessor.

The electrical load is energized only when the at least one combinatorial logic block and the microprocessor in combination enable a source and sink commands from the first and second switch, respectively.

A first and a second feedback circuit provide switch status monitoring to the microprocessor which is adapted for annunciating a fault condition through the use of a watch dog and fault annunciator elements.

The arrangement of the combinatorial logic block, microprocessor, and first and second feedback signals eliminate any possibility for the microprocessor software to inadvertently energize the electrical load thus removing any fail-safe requirement from the software execution in itself.

OBJECTS OF THE INVENTION

It is, therefore, one of the primary objects of the present invention to provide an electronic circuit arrangement for switching an electrical load.

It is another object of the present invention to provide an electronic circuit arrangement for switching an electrical load in a fail-safe manner.

It is yet another object of the present invention to provide an electronic circuit arrangement for switching an electrical load in a fail-safe manner that validates input condition signals.

It is a further object of the present invention to provide an electronic circuit arrangement for switching an electrical load in a fail-safe manner that eliminates software influence from inadvertently energizing the electrical load.

It is yet a further object of the present invention to provide an electronic circuit arrangement for switching an electrical load in a fail-safe manner that prevents a single failure of any components from affecting proper application of an electrical load.

It is additional object of the present invention to provide an electronic circuit arrangement for switching an electrical load in a fail-safe manner that is capable of annunciating component failures.

In addition to the various objects and advantages of the present invention which have been generally described above, there will be various other objects and advantages of the invention that will become more readily apparent to those persons who are skilled in the relevant art from the following more detailed description of the invention, par-

DESCRIPTION OF THE PRESENTLY PREFERRED AND VARIOUS ALTERNATIVE EMBODIMENTS OF THE INVENTION

Before describing the invention in detail, the reader is advised that, for the sake of clarity and understanding, identical components having identical functions have been marked where possible with the same reference numerals in each of the Figures provided in this document.

Figure 1:
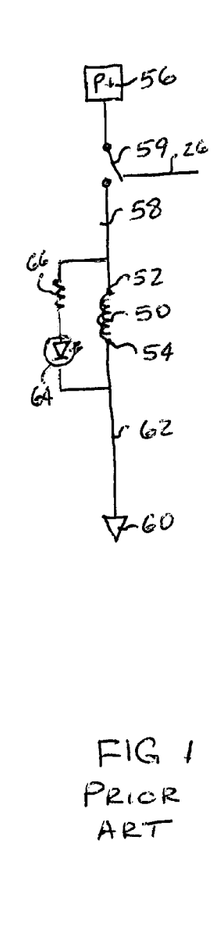
FIG. 1 is a schematic representation of a prior art electronic circuit for switching an electrical load.

To assist the reader in understanding the environment in which the invention will typically be used, FIG. 1 illustrates a typical circuit for switching an electrical load 50 having first and second terminal connections 52 and 54 respectively. The electrical load 50 is connected to an electrical power supply source 56 via a first supply path 58 and a switch 59, which is shown with normally open contacts. A second terminal 54 of the electrical load 50 is connected to a first conductor 60 via a second supply path 62. Preferably, such first conductor 60 is a ground. Preferably, the second supply path 62 has substantially zero resistance. Closure of the switch 59 contact upon receipt of at least one enabling signal 26 will enable flow of the power from the electrical energy power supply source 56 through the electrical load 50 to the first conductor 60 enabling the electrical load 50 to energize and switch its state from OFF to ON.

Opening of the switch 59 contact or loss of power supply from the electrical power supply source 56 will deenergize the electrical load 50 and switch its state to the original OFF state.

A light emitting diode 64 in series with the resistor 66 may be electrically coupled in parallel with the electrical load 50 for visual identification thereof in the energized or deenergized condition.

An example of such application may include but not limited to operating an electrical motor, activating a solenoid or energizing a secondary energy source from the main power supply source 56. The at least one condition signal 26 may be a pushbutton 26 of the switch 59.

Figure 2:
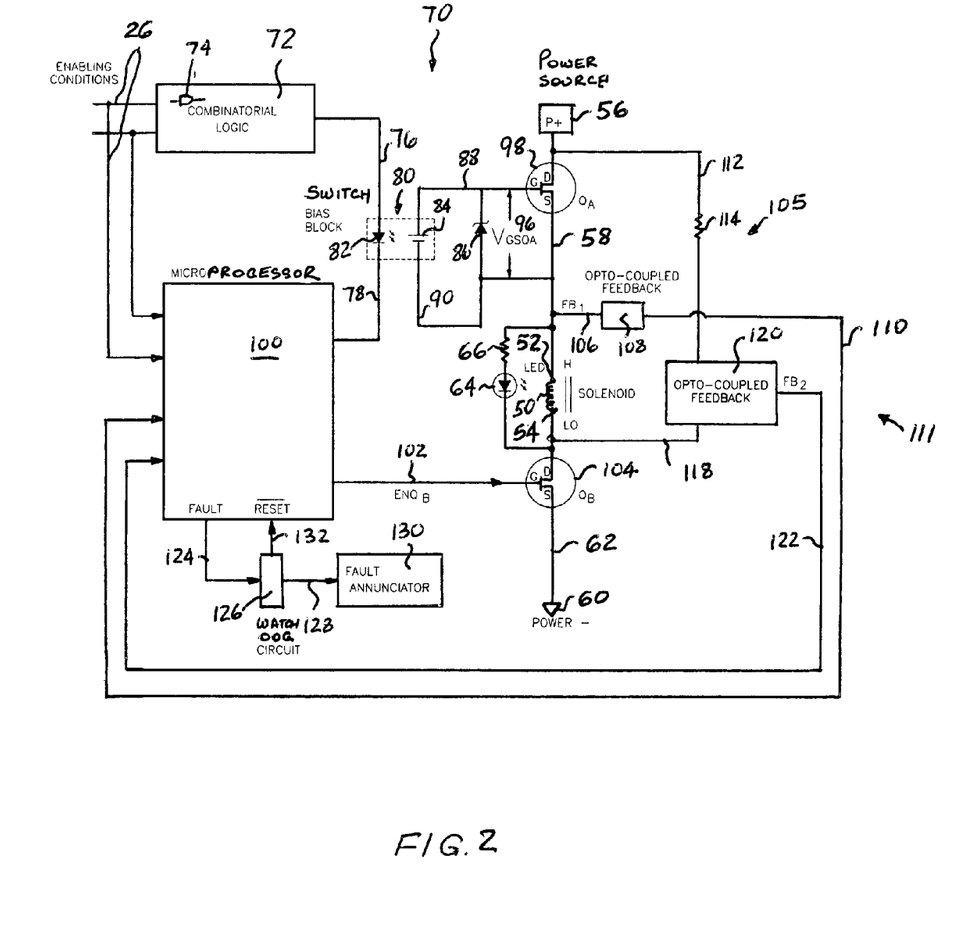
FIG. 2 is a schematic representation of an electronic circuit arrangement of a first embodiment for switching an electrical load in a fail-safe manner.

A structure and operation of an electronic circuit arrangement, generally designated 70, of the first embodiment will be described in combination with one type of electrical load 50 such as solenoid, schematically represented by its coil 50.

The electronic circuit arrangement 70 of the first embodiment for switching such electrical load 50 in a fail-safe manner is illustrated in FIG. 2 and includes at least one logic manipulator means 72, which is, preferably, at least one combinatorial logic block 72 consisting of a first predetermined number of gate arrays 74 disposed in a first predetermined configuration based on the quantity and type of the at least one condition signal 26. Such at least one combinatorial logic block 72 executes a truth table to output a first enabling signal 76 when such at least one condition signal 26 has been determined valid. Preferably, such first enabling signal 76 is capable of sourcing electrical current. The first enabling signal 76 is fed into a switch biasing means, generally designated 80, which, in the preferred embodiment, is a monolithic photovoltaic isolator 80 consisting of a photo emitting diode 82 and a photovoltaic generator at its output 84. Upon current flow through the photo emitting diode 82, such switch biasing means 80 produces a first conduction signal 88 and a parallel second conduction signal 90 which in combination with a zener diode 86 provide a predetermined bias voltage 96 to activate a first switch 98 enabling electrical supply current to flow from the electrical power supply source 56 to the first terminal 52. In applications were the second terminal 54 is connected directly to the first conductor 60 via the second supply path 62, such supply of the electrical current will energize the coil 50 and switch its state from OFF to ON.

In the exemplary embodiment, such first switch 98 is, preferably, a well known power semiconductor such as first transistor 98 which will enable an electrical current to flow from drain D to source S when the bias voltage 96 is applied to its gate G. It will be appreciated that the first switch 98 is only biased under normal conditions and allowed to conduct only when the at least one condition signal 26 is determined to be valid by the at least one logic manipulator means 72.

Preferably, such first transistor 98 is a Metal Oxide Semiconductor Field Effect Transistor hereinafter referred to as MOSFET. In the presently preferred embodiment of the invention, the first transistor 98 is an N-channel MOSFET, but a P-channel MOSFET can be used equally well.

It will be further appreciated that any circuit arrangement capable of producing bias voltage 96 upon receiving at least one current signal 76 may be used in place of the monolithic photovoltaic isolator 80.

Removal of the at least one condition signal 26 or receipt of a different at least one condition signal 26 will enable the at least one logic manipulator element 72 to discontinue the first enabling signal 76 and, more importantly, to discontinue supply of the electrical current to the coil 50.

The electronic circuit arrangement 70 may further include a second logic manipulator element 100 adapted to receive such at least one condition signal 26 and output a second enabling signal 78 to the switch biasing means 80. Preferably, such second logic manipulator element 100 is a microprocessor 100 programmed to execute a predetermined software algorithm containing the same truth table as in such first logic manipulator means 72 for independently interpreting such at least one condition signal 26 and providing such second enabling signal 78 when such at least one condition signal 26 is determined to be valid. Preferably, such second enabling signal 78 is capable of sinking the electrical current.

The microprocessor 100 is further adapted to output a third enabling signal 102 capable of energizing a second switch 104, preferably a well known power semiconductor such as second transistor 104, disposed serially between the second terminal 54 of the coil 50 and the first conductor 60. The microprocessor 100 is additionally adapted to energize the coil 50 once the flow of the supply electrical current is enabled by the first switch 98.

It will be understood that coil 50 will be energized only when the at least one combinatorial logic block 72 and the microprocessor 100 have enabled a source and sink commands from the first and second switches 98 and 104 respectively.

Such electronic circuit arrangement 70 may additionally include at least one feedback arrangement, generally designated 105, which is coupled to the first supply path 58 intermediate the first switch 98 and the first terminal 52 of the coil 50. Such feedback arrangement 105 consists of a first signal path 106 coupled to a first feedback element 108 which produces a first feedback signal 110 received by the microprocessor 100. Such first feedback element 108 is electro galvanically protected, preferably being an opto-coupler, to provide galvanic insulation and thus monitor the first feedback signal 110 in a non-intrusive manner.

Preferably, a second feedback arrangement, generally designated 111, which has a second signal 112 coupled to the first supply path 58 intermediate the first switch 98 and electrical power supply source 56 and a third signal 118 coupled to the second supply path 62 intermediate the second terminal 54 of the coil 50 and the first conductor 60. The second signal 112 and the third signal 118 are further coupled to a second feedback element 120 which produces a second feedback signal 122 received by the microprocessor 100. Such second feedback element 120 is electro galvanically protected, preferably being an opto-coupler, to provide galvanic insulation and thus monitor the second feedback signal 122 in a non-intrusive manner.

The microprocessor 100 utilizes the first and second opto-coupled feedback elements 108 and 120 respectively to monitor functionality of the first switch 98 and the second switch 104 and transmit a fault condition to a fault annunciator 130 via a watch dog element 126 and plurality of signal paths 124, 128 and 132 as illustrated in FIG. 2.

Figure 3:
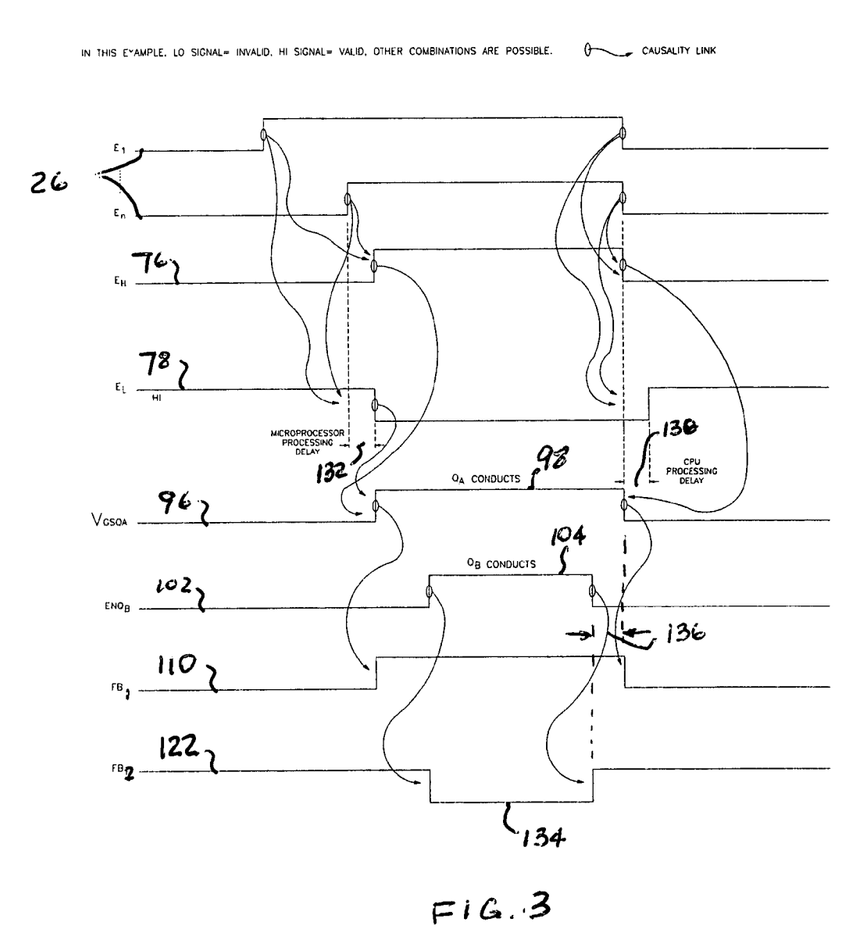
FIG. 3 is a timimg diagram of an electronic circuit arrangement for switching an electrical load in a fail-safe manner of FIG. 2.

The operation of the electronic circuit arrangement 70 of the exemplary embodiment is best illustrated in FIG. 3. In a normal operation the combinatorial logic block 72 and the microprocessor 100 will independently validate the at least one condition signal 26 which will be registered as HIGH. Preferably, after a first predetermined delay 132 within the microprocessor 100, the first and second enabling signals 76 and 78 respectively will turn ON the first switch 98 enabling passage of the supply electrical current to the first terminal 52 of the coil 50. Simultaneously, the first feedback signal 110 will be registered as HIGH by the microprocessor 100 enabling the microprocessor to provide a third enabling signal 102 to turn ON the second switch 104 and receive a second feedback signal 122 indicating the coil 50 has been energized or switched its state from OFF to ON.

After a second predetermined period of time 134, the microprocessor 100 will discontinue the third enabling signal 102 and switch the second switch 104 to OFF, followed by the loss of the second feedback signal 122.

After a third predetermined period of time 136, the at least one combinatorial logic block 72 will discontinue the first enabling signal 76 thus switching the first switch 98 to OFF followed by a loss of the first feedback signal 110.

And, finally, after a forth predetermined period of time 138 the microprocessor 100 will discontinue the second enabling signal 78.

The operation of the electronic circuit arrangement 70 in respect to the fail-safe predictability attribute of switching the state of the coil 50 can be illustrated as follows.

The first switch 98 will conduct only when the first and the second enabling signals 76 and 78 respectively are valid. If the first enabling signal 76 is latched HIGH due to the failure in the first logic manipulator element 72, the first switch 98 will not conduct due to the second enabling signals 78 being an open circuit. Accordingly, if the second enabling signal 78 is latched LOW, the first switch 98 will not conduct due to the first enabling signal 76 being an open circuit. The microprocessor 100 will not receive the expected first feedback signal 110 and annunciate a fault condition to the fault annunciator 130.

Similarly, the failure of the second enabling signal 102 will not conduct the second switch 104 and will not produce the second feedback signal 122 expected by the microprocessor 100 enabling thereof to annunciate the fault condition to the fault annunciator 130.

If the first switch 98 is failed in a shorted mode prior to presence of the first enabling signal 76, the microprocessor 100 will at least detect an unexpected presence of the first feedback signal 110 and will not provide the third enabling signal 102, thus preventing passage of the electrical supply current through the second switch 104 and, more importantly, preventing the coil 50 to energize.

If the first switch 98 is failed in an open mode, the electrical current will not energize the coil 50 and will not produce expected first and second feedback signals 110 and 122 respectively.

It will be appreciated that the same analysis will apply to failures of the second switch 104 in either short or open modes.

Those skilled in the art will readily understand from the discussed supra analysis that any failure of the circuit arrangement 70 will not cause a condition wherein the coil 50 is energized thus enabling fail-safe predictable operation thereof.

The performance of the circuit arrangement 70 in respect to the failure detection attribute of energizing coil 50 can be illustrated as follows.

Prior to energizing the coil 50, when the at least one condition signal 26 has been determined valid, the second feedback signal 122 should normally read as LOW input, confirming that the first switch 98 is turned OFF or being in a non conducted state.

When the at least one condition signal 26 has been determined valid, both the first and the second enabling signals 76 and 78 respectively will conduct, causing the first switch 98 to conduct. This can be verified using the second feedback signal 122, which should read as a High signal confirming that the first switch 98 can properly toggle between ON and OFF states.

When the first switch 98 conducts and the second switch 104 is not yet turned ON or not yet conducted, the continuity of the electrical current path through the coil 50 and the proper state of the second switch 104 can be verified using the first feedback signal 110, which should be read as HIGH signal by the microprocessor 100.

When the second switch 104 is turned ON, the first feedback signal 110 will be read as a LOW signal by the microprocessor 100, confirming that the second switch 104 can properly toggle between ON and OFF states.

If the first, second or third enabling signals 76, 78 and 102 respectively or the bias voltage 96 are not produced upon at least one gate array block 72 validating the at least one condition signal 26, the microprocessor 100 will not receive expected first and second feedback signals 110 and 122 respectively.

Any discrepancy in readings of the second feedback signal 122 and the first feedback signal 110 means that the circuit arrangement 70 is at fault.

In the preferred embodiment, the microprocessor 100 enables failure detection and annunciation. Its predetermined software algorithm executes an internal watch dog routine that must generate a regular pulse train in order to set the watch dog element 126 and disable the fault annunciator 130. Whenever the pulse train is interrupted, the fault annunciator 130 is enabled.

The microprocessor 100 further executes an internal routine of verifying the validity of at least one condition signal 26 sequence thus assisting the detection of failures in the circuit portion responsible for generation of signals and their connections to the circuit discussed hereabove. The output signals 78, 102 and 124 produced by the microprocessor 100 must be in their inactive state upon reset thereof to ensure proper power-up operation.

In an alternative embodiment of the electronic circuit arrangement 70, a second combinatorial logic block 72 of the second predetermined configuration performing all microprocessor functions and outputting identical signals 78, 102 and 124 may replace the microprocessor 100.

Of outmost importance in maintaining the fail-safe application of the coil 50 is a prevention of the predetermined software algorithm of the microprocessor 100 from inadvertently energizing such coil 50. In the present invention if the microprocessor 100 fails to execute software algorithm, fault signal 124 is latched HIGH or LOW and the watch dog circuit will time-out, leading to the annunciation of such fault signal 124 through the fault annunciator 130. Moreover, even if second enabling signal 78 and third enabling signal 102 are latched in the valid state, the coil 50 is prevented from energizing unless the at least one condition signal 26 has been independently validated by the at least one combinatorial logic block 72, thus enabling fail safe operation.

If the microprocessor 100 executes a wrong software algorithm sequence, second and third enabling signals 78 and 102 respectively will become valid at random, however, the at least one combinatorial logic block 72 will still ensure the fail-safe operation of the electronic circuit arrangement 70. Moreover, the watch dog element 126 is designed to be reset only by a precise timing sequence of the fault signal 124. If the pulse frequency of the fault signal 124 is either too HIGH or too LOW, the fault will be annunciated and latched through fault annunciator 130.

Those skilled in art can readily see that failure of the software of the microprocessor 100 will result in a fail-safe operation of the electronic circuit arrangement 70 and that any failure therewithin will be annunciated through the fault annunciator 130. Therefore, the predetermined software algorithm executed by the microprocessor 100 is not critical for fail-safe application of the coil 50.

In applications that do not require such degree of fail-safe operation, a single logic manipulator 72 being either a combinatorial logic block 72 or a microprocessor 72 may be adapted for providing the first and third enabling signals 76 and 102 respectively, receiving first and second feedback signals 110 and 122 respectively, and interfacing to the fault annunciator 130.

It will be appreciated that in the most preferred embodiment, the coil 50 is disposed intermediate first and second switches 98 and 104 respectively and the bias voltage 96 is produced by a combination of the first logic manipulator 72 and the second logic manipulator 100, independently validating the at least one condition signal 26.

Figure 4:
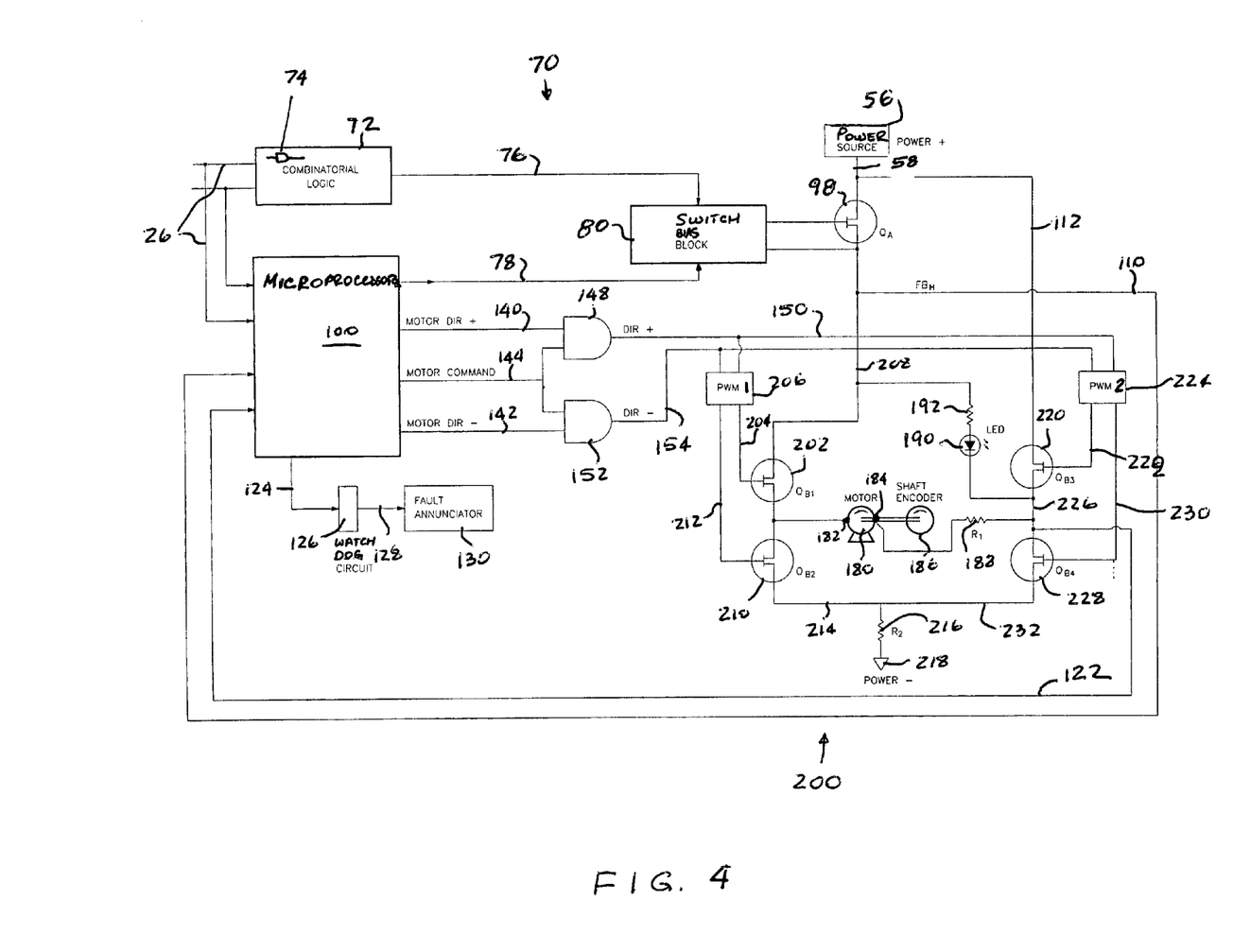
FIG. 4 is a schematic representation of an electronic circuit arrangement of a second embodiment for switching an electrical load in a fail-safe manner, particluarly applied to a motor operation of a transit vehicle door system.

Reader's attention is now directed to FIG. 4 which illustrates another embodiment of the invention applied to a well known H-bridge circuit, generally designated 200, for control of an electric motor 180 of a door operator of a transit vehicle which are not shown but well known in the art. In such exemplary embodiment, it is essential to drive the door operator (not shown) in a close direction by default and to drive such door operator (not shown) in an open direction only when the at least one condition signal 26 is validated. It will be appreciated that close and open directions will be related to a rotational direction of the electric motor 180.

The H-bridge circuit 200 includes a first H-bridge switch 202 having a signal path 204 to a first Pulse Width Modulation (PWM) element 206. A second H-bridge switch 210 is further connected to the first Pulse Width Modulation element 206 via a signal path 212. The H-bridge circuit 200 further includes a third H-bridge switch 220 having a signal path 222 to a second Pulse Width Modulation element 224 and a fourth H-bridge switch 228 having a signal path 230 to the second Pulse Width Modulation element 224. It will be appreciated that other H-bridge circuits employing additional switch means may be utilized in the present invention.

Each of the first and second Pulse Width Modulation elements 206 and 224 respectively are coupled to a first motor power signal 150 and a second motor power signal 154 generated by the microprocessor 100 thorough a pair of logic gates 148 and 152.

The first logic gate 148 is adapted for receiving a motor command signal 144 in combination with a first motor direction signal 140, being an open direction motor signal 140.

The second logic gate 152 is adapted for receiving a motor command signal 144 in combination with a second motor direction signal 142, being a closed direction motor signal 140.

To drive the electric motor 180 in the close direction, the second H-bridge switch 210 and third H-bridge switch 220 are driven by their respective first and second Pulse Width Modulation elements 206 and 224 respectively, while the first H-bridge switch 202 and the fourth H-bridge switch 228 are maintained in an OFF state. The electrical current supply to the third H-bridge switch 220 is taken directly from the power supply source 56 through the signal line 112 and is independent of the first switch 98 operation.

To drive the electric motor 180 in the open direction, the first switch 98 is turned ON enabling the supply of electrical current to pass through the first H-bridge switch 202, the electric motor 180, and the fourth H-bridge switch 228.

This is accomplished in the discussed supra manner by the presence of at least one condition signal 26 validated by both the first combinatorial logic block 72 and the microprocessor 100, in turn generating valid first and second enabling signals 76 and 78 respectively.

It will be appreciated that the motor command signal 144 used for enabling and disabling the first and the second Pulse Width Modulation elements 206 and 224 respectively is equivalent to the third enabling signal 102 in FIG. 2.

Monitoring of the electric motor 180 switching is performed by the first and the second feedback signals 110 and 122 respectively. A light emitting diode 190 in series with the resistor 192 are provided for visual identification of the electric motor 180 in the energized or deenergized conditions.

Alternatively, monitoring of a switched state of the electric motor 180 may be performed by reading pulses generated by a motor shaft encoder 186 to detect the rotation of the electric motor 180 including an indication of its rotational direction and further determining the electrical current magnitude flowing in the motor circuit and H-bridge return circuit branches by using voltage reading across a first and a second shunt resistors 188 and 216 respectively.

While the presently preferred embodiment of the instant invention has been described in detail above in accordance with the patent statutes, it should be recognized that various other modifications and adaptations of the invention may be made by those persons who are skilled in the relevant art without departing from either the spirit of the invention or the scope of the appended claims.

We claim:

1. An electronic circuit arrangement for switching a state of an electrical load in a fail-safe manner, said electrical load being disposed in a path intermediate a power source and a first conductor, said electronic circuit arrangement coupled to at least one condition signal, said electronic circuit arrangement comprising:
   a) at least one logic manipulator means for receiving and processing said at least one condition signal and executing a predetermined truth table;
   b) a first enabling signal generated by said at least one logic manipulator means upon executing said truth table and validating said at least one condition signal;
   c) a switch biasing means coupled to said at least one logic manipulator means for generating a bias voltage upon receiving said first enabling signal;
   d) a first switch means disposed in a portion of said path intermediate said power source and said electrical load and coupled to said switch biasing means, said first switch means conducting upon generation of said bias voltage and passing a supply electrical current therethrough;
   e) whereby passage of said supply electrical current through said first switch means causes said electrical load directly coupled to said first conductor to switch from a first state to a second state; and
   f) whereby at least a discontinuation of said at least one condition signal causes said at least one logic manipulator means to discontinue said first enabling signal and discontinue passage of said supply electrical current to said electrical load switching thereof from said second state to said first state.

2. A circuit arrangement according to claim 1, wherein said at least one logic manipulator means is a combinatorial logic block of a first predetermined configuration having at least one gate array.

3. A circuit arrangement according to claim 1, wherein said first enabling signal is capable of sourcing a control electrical current.

4. A circuit arrangement according to claim 1, wherein said switch biasing means is a monolithic photovoltaic isolator including a photo emitting diode and a photovoltaic generator at an output thereof.

5. A circuit arrangement according to claim 1, wherein said first switch means is a power semiconductor.

6. A circuit arrangement according to claim 5, wherein said power semiconductor is a transistor having a gate electrode for receiving said bias voltage and a pair of drain and source electrodes enabling passage of said supply electrical current from said power source to said electrical load.

7. A circuit arrangement according to claim 1, wherein said circuit arrangement further includes a light emitting diode and a resistor serially coupled thereto for visual identification of said electrical load being in one of said first and said second states.

8. A circuit arrangement according to claim 1, wherein said circuit arrangement further includes a second logic manipulator means for receiving said at least one condition signal, for providing a second enabling signal to said switch biasing means and for providing a third enabling signal.

9. A circuit arrangement according to claim 8, wherein said second enabling signal is capable of sinking said control electrical current.

10. A circuit arrangement according to claim 8, wherein said third enabling signal is a voltage signal.

11. A circuit arrangement according to claim 8, wherein said second logic manipulator means is a microprocessor capable of executing a predetermined software algorithm having said truth table for validating said at least one condition signal independently from said first logic manipulator means.

12. A circuit arrangement according to claim 8, wherein said circuit arrangement further includes a watch dog means coupled to said microprocessor.

13. A circuit arrangement according to claim 12, wherein said circuit arrangement further includes a fault annunciation means coupled to said watch dog means.

14. A circuit arrangement according to claim 8, wherein said second logic manipulator means is a second combinatorial logic block of a second predetermined configuration capable of providing said second and third enabling signals.

15. A circuit arrangement according to claim 1, wherein said circuit arrangement further includes a second switch means disposed intermediate said electrical load and said first conductor and conducting upon receiving said third enabling signal enabling passage of said supply electrical current therethrough.

16. A circuit arrangement according to claim 15, wherein said second switch means is a second power semiconductor.

17. A circuit arrangement according to claim 16, wherein said second power semiconductor is a second transistor having a second gate electrode for receiving a second voltage signal and a second pair of drain and source electrodes enabling passage of said supply electrical current from said electrical load to said first conductor.

18. A circuit arrangement according to claim 1, wherein said circuit arrangement further includes at least one feedback means associated with said state of said electrical load.

19. A circuit arrangement according to claim 18, wherein said at least one feedback means is galvanically isolated.

20. A circuit arrangement according to claim 18, wherein said at least one feedback means includes a first feedback means coupled to a portion of said path intermediate said first switch means and said electrical load and further coupled to one of said first logic manipulator means, a second logic manipulator means and a combination thereof.

21. A circuit arrangement according to claim 20, wherein said at least one feedback means further includes a second feedback means coupled to a portion of said path intermediate said power source and said first switch means and to a portion of said path intermediate said electrical load and said second switch means and further coupled to one of said first logic manipulator means, said second logic manipulator means and said combination thereof.

22. A circuit arrangement according to claim 1, wherein said first conductor is a ground.

23. An electronic circuit arrangement for switching a state of an electrical load in a fail-safe manner, said electrical load being disposed in a path intermediate a power source and a first conductor, said electronic circuit arrangement coupled to at least one condition signal, said electronic circuit arrangement comprising:
   a) a first logic manipulator means for receiving and processing said at least one condition signal, said first logic manipulator means capable of executing a predetermined truth table for validating said at least one condition signal;

b) a second logic manipulator means for receiving and processing said at least one condition signal, said second logic manipulator means capable of executing a predetermined software algorithm having said predetermined truth table for validating said at least one condition signal independently from said first logic manipulator means;

c) a first enabling signal generated by said first logic manipulator means upon executing said predetermined truth table and validating said at least one condition signal, said first enabling signal capable of sourcing a control electrical current;

d) a second enabling signal generated by said second logic manipulator means upon validating said at least one condition signal, said second enabling signal capable of sinking said control electrical current;

e) a third enabling signal generated by said second logic manipulator means upon validating said at least one condition signal, said third enabling signal being a control voltage signal;

f) a switch biasing means coupled to said first and second logic manipulator means for generating a bias voltage upon receiving said first and second enabling signals;

g) a first switch means disposed in a portion of said path intermediate said power source and said electrical load and coupled to said switch biasing means, said first switch means conducting upon generation of said bias voltage and passing a supply electrical current therethrough;

h) a second switch means disposed in a portion of said path intermediate said electrical load and said first conductor and conducting upon receiving said third enabling signal for passing said supply electrical current therethrough;

i) a watch dog means coupled to said second logic manipulator means;

j) a fault annunciation means coupled to said watch dog means;

k) whereby passage of said supply electrical current through said first and second switch means and said electrical load switches said electrical load from a first state to a second state; and l) whereby at least a discontinuation of said at least one condition signal causes said first and second logic manipulator means to discontinue at least one of said first, second and third enabling signals and discontinue passage of said supply electrical current through said electrical load switching thereof from said second state to said first state.

24. A circuit arrangement according to claim 23, wherein said circuit arrangement further includes a first feedback means coupled to said path intermediate said first switch means and said electrical load and a second feedback means coupled to said path intermediate said first switch means and said electrical load and intermediate said electrical load and said second switch means, said first and second feedback means further coupled to one of said first logic manipulator means, said second logic manipulator means and a combination thereof;

whereby said first feedback means generates a first feedback signal upon passage of said supply electrical current through said first switch means, said first feedback signal enabling said second logic manipulator means to generate said third enabling signal;

whereby said second feedback means generates a second feedback signal upon passage of said supply electrical current through said second switch means, said second feedback signal validating change of said electrical load from said first state to said second state;

whereby a failure of one of said first and second enabling signals upon validation of said at least one condition signal prevents passage of said supply electrical current through said first switch means, disables generation of said first feedback signal, disables generation of said third enabling signal and enables said second logic manipulator means to generate a fault signal to said fault annunciation means;

whereby a failure of said first switch in a shorted condition prior to generation of one of said first enabling signal, said second enabling signal and said combination thereof enables generation of said first feedback signal, said generated first feedback signal received by said second logic manipulator means disables generation of said third enabling signal preventing passage of said supply electrical current through said second switch means and enables said second logic manipulator means to generate said fault signal to said fault annunciation means;

whereby a failure of said second switch means in a shorted condition prior to generation of said third enabling signal generates said second feedback signal, said generated second feedback signal received by said second logic manipulator means enabling thereof to discontinue said second and third enabling signals, discontinue passage of said supply electrical current through said electrical load and generate said fault signal to said fault annunciation means;

whereby a failure of one of said first and second switches in an open condition disables generation of said first and second feedback signals and enables said second logic manipulator means to generate said fault signal to said fault annunciation means;

whereby a failure of said second logic manipulator means to execute said predetermined software algorithm enables said watch dog means to generate said fault signal and enables passage of said supply electrical current through said electrical load upon said at least one condition signal being validated by said first logic manipulator means; and whereby a failure within said predetermined software algorithm enables passage of said supply electrical current through said electrical load upon said at least one condition signal being validated by said first logic manipulator means.

25. An electronic circuit arrangement for switching a rotation directional state of an electrical motor in a fail-safe manner, said electrical motor being disposed in a path intermediate a power source and a first conductor, said electronic circuit arrangement coupled to at least one condition signal, said electronic circuit arrangement comprising:

a) a first logic manipulator means for receiving and processing said at least one condition signal, said first logic manipulator means capable of executing a predetermined truth table for validating said at least one condition signal and generating a first enabling signal upon validating said at least one condition signal, said first enabling signal capable of sourcing a control electrical current;

b) a second logic manipulator means for receiving and processing said at least one condition signal, said second logic manipulator means capable of executing a predetermined software algorithm having said predetermined truth table for validating said at least one condition signal independently from said first logic manipulator means, said second logic manipulator mean generating a second enabling signal, a first rotation directional signal, a second rotation directional signal and a command signal, said second enabling signal capable of sinking said control electrical current;

c) a switch biasing means coupled to said first and second logic manipulator means for generating a bias voltage upon receiving said first and second enabling signals;

d) a first switch means disposed in a path intermediate said power source and said electrical motor and coupled to said switch biasing means, said first switch means conducting upon generation of said bias voltage and passing a supply electrical current therethrough;

e) a first logic gate for receiving said first directional signal and said command signal and generating a first directional motor power signal;

f) a second logic gate for receiving said second directional signal and said command signal and generating a second directional motor power signal;

g) a first pulse width modulation means coupled to said first and second directional signals;

h) a second pulse width modulation means coupled to said first and second directional signals;

i) a second switch means disposed in said path intermediate said power source and said first conductor and coupled to said first and second pulse width modulation means;

j) a feedback means disposed within said circuit arrangement for providing at least one status feedback signal to one of said first logic manipulator means, said second logic manipulator means and a combination thereof;

k) whereby receipt of said at least one condition signal by said first and second logic manipulator means enables generation of said first directional motor power signal and passage of said supply electrical current through said first switch means enabling said electrical motor to rotate in a first direction; and l) whereby at least a discontinuation of said at least one condition signal causes said first and second logic manipulator means to discontinue passage of said power electrical current through said first switch, enables generation of said second directional motor power signal and enables said electrical motor to rotate in a second direction.

26. A circuit arrangement according to claim 25, wherein said circuit arrangement includes a predetermined plurality of said second switch means forming an h-bridge motor control circuit and having a first pair of diagonally opposite second switch means being associated with said first directional motor power signal and a second pair of diagonally opposite second switch means being associated with said second directional motor power signal.

27. A circuit arrangement according to claim 25, wherein said feedback means includes a first feedback signal and a second feedback signal associated with said first and second switch means and said path intermediate said power source and said first conductor.

28. A circuit arrangement according to claim 25, wherein said feedback means is achieved by monitoring pulses generated by an encoder attached to an output shaft of said electric motor and by determining a magnitude of said supply electrical current passing through said electrical motor, said second switch means, a first shunt resistor serially coupled to said electric motor and a second shunt resistor disposed intermediate said second switch means and said first conductor.

* * * * *